(12) United States Patent
Gan et al.

(10) Patent No.: US 8,013,561 B2
(45) Date of Patent: Sep. 6, 2011

(54) DRIVING MECHANISM HAVING POSITION ENCODER FOR TWO-DIMENSIONAL POSITIONING

(75) Inventors: Wai Chuen Gan, Hong Kong (CN); Gary Peter Widdowson, Hong Kong (CN)

(73) Assignee: ASM Assembly Automation Ltd, Hong Kong (CN)

( * ) Notice: Subject to any disclaimer, the term of this patent is extended or adjusted under 35 U.S.C. 154(b) by 441 days.

(21) Appl. No.: 12/206,831

(22) Filed: Sep. 9, 2008

(65) Prior Publication Data

US 2010/0063631 A1    Mar. 11, 2010

(51) Int. Cl.
    *B64C 17/06*    (2006.01)
(52) U.S. Cl. ............... 318/649; 318/601; 318/480

(58) Field of Classification Search ............... 318/649, 318/601, 480; 700/275; 327/365
See application file for complete search history.

(56) References Cited

U.S. PATENT DOCUMENTS

| | | |
|---|---|---|
| 5,757,182 A | 5/1998 | Kitazawa |
| 6,765,195 B1 | 7/2004 | Leviton |
| 2003/0137908 A1* | 7/2003 | Sakamoto et al. ........... 369/47.1 |
| 2005/0238752 A1* | 10/2005 | Toncelli ..................... 425/447 |

* cited by examiner

*Primary Examiner* — Karen Masih
(74) *Attorney, Agent, or Firm* — Ostrolenk Faber LLP

(57) ABSTRACT

A driving mechanism comprises a fixed housing, a movable housing on which an object to be driven is mounted and a driving motor which is operative to drive the movable housing to move linearly as well as to rotate relative to the fixed housing. An inductance-type encoder determines both linear and rotary displacement of the movable housing relative to the fixed housing, whereby to provide closed-loop control of the position of the object in both linear and rotary directions.

20 Claims, 4 Drawing Sheets

DRIVING MECHANISM HAVING POSITION ENCODER FOR TWO-DIMENSIONAL POSITIONING

FIELD OF THE INVENTION

The invention relates to a driving mechanism for positioning objects, and in particular to a driving mechanism with a position encoder to allow controlled positioning by the driving mechanism in two dimensions during operation.

BACKGROUND AND PRIOR ART

Certain driving mechanisms for driving objects such as camera lenses need to be capable of accurately positioning the object in at least two dimensions, such as in the rotary and linear directions, during operation. Usually, the linear and angular positions of rotary-linear driving mechanism can be determined by optical means. For example, U.S. Pat. No. 6,765,195 entitled "Method and Apparatus for Two-Dimensional Absolute Optical Encoding" describes an optical encoder for determining the position of an object in two dimensions. The encoder comprises a scale having a pattern being predetermined to indicate an absolute location on the scale, means for illuminating the scale, means for forming an image of the pattern, detector means for outputting signals and analyzing means for determining the absolute location of the object in two directions. From the scale and pattern, the position of the object is known, and the driving mechanism may thus control the movement of the object in two dimensions.

However, optical encoders are generally bulky and expensive to use. In particular, much space is required for installing the encoder lens assembly as well as an optical scale to detect the position of the object. For a compact apparatus where installation space is at a premium, an optical encoder is not desirable.

Another type of encoder uses an inductance-type sensor which does not need optical means to detect the position of an object. An example of such an encoder is disclosed in U.S. Pat. No. 5,757,182 entitled "Variable-Reluctance-Type Angular Rotation Sensor with Sinusoidally Distributed Winding". In this set-up, sinusoidally distributed windings are formed on uniformly-distributed slots such that the angular position of the driven object can be determined using variable-reluctance principles. However, such inductance sensors have conventionally not been able to detect the position of an object in two directions, such as both angular displacement as well as linear displacement. Accordingly, the driving mechanisms incorporating inductance-type position encoders are operative to provide controlled driving of an object only in one direction, specifically the rotary direction. It would be desirable to provide an inductance-type encoder that is more compact than an optical encoder and is able to detect the position of an object in two dimensions. Such a driving mechanism may provide controlled driving of an object in two dimensions, especially in applications which require the driving mechanism to move an object linearly as well as to rotate the object.

SUMMARY OF THE INVENTION

It is thus an object of the invention to seek to avoid the disadvantages of an optical encoder by providing an inductance-type encoder which can detect rotary as well as linear displacement of an object by a driving mechanism which drives the object in two directions.

According to a first aspect of the invention, there is provided a driving mechanism comprising: a fixed housing; a movable housing on which an object to be driven is mounted; a driving motor which is operative to drive the movable housing to move linearly as well as to rotate relative to the fixed housing; and an inductance-type encoder operative to determine both linear and rotary displacement of the movable housing relative to the fixed housing, whereby to provide closed-loop control of the position of the object in both linear and rotary directions.

According to a second aspect of the invention, there is provided a method of driving a movable housing on which an object to be driven is mounted, comprising the steps of: driving the movable housing with a driving motor to move linearly as well as to rotate relative to a fixed housing; determining a linear displacement of the movable housing relative to the fixed housing with an inductance-type encoder; and determining a rotary displacement of the movable housing relative to the fixed housing with the inductance-type encoder, whereby to provide closed-loop control of the position of the object in both linear and rotary directions.

It will be convenient to hereinafter describe the invention in greater detail by reference to the accompanying drawings. The particularity of the drawings and the related description is not to be understood as superseding the generality of the broad identification of the invention as defined by the claims.

BRIEF DESCRIPTION OF THE DRAWINGS

An example of an apparatus according to the preferred embodiment of the invention will now be described with reference to the accompanying drawings, in which.

DETAILED DESCRIPTION OF THE PREFERRED EMBODIMENT OF THE INVENTION

Figure 1:
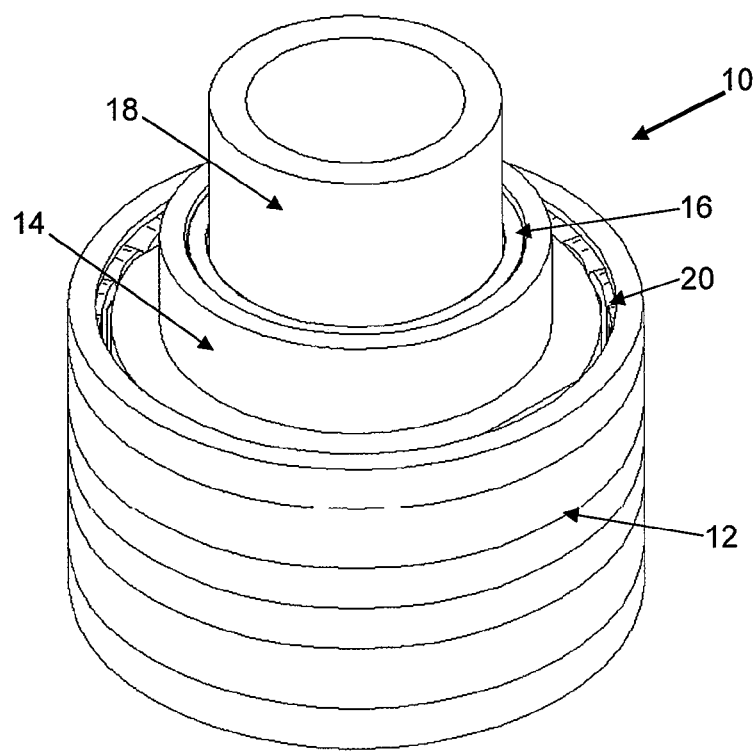
FIG. 1 is an isometric view of one end of the driving mechanism according to the preferred embodiment of the invention which incorporates an inductance-type encoder.

FIG. 1 is an isometric view of one end of the driving mechanism 10 according to the preferred embodiment of the invention which incorporates an inductance-type encoder. The driving mechanism 10 generally comprises a fixed housing 12, a movable housing 14 for mounting an object to be driven, such as an optical lens system, linear-rotary bearings 16 and a centrally-located central cylinder 18. The driving mechanism 10 also comprises resolver coils 20 comprised in the induction-type encoder.

Figure 2:
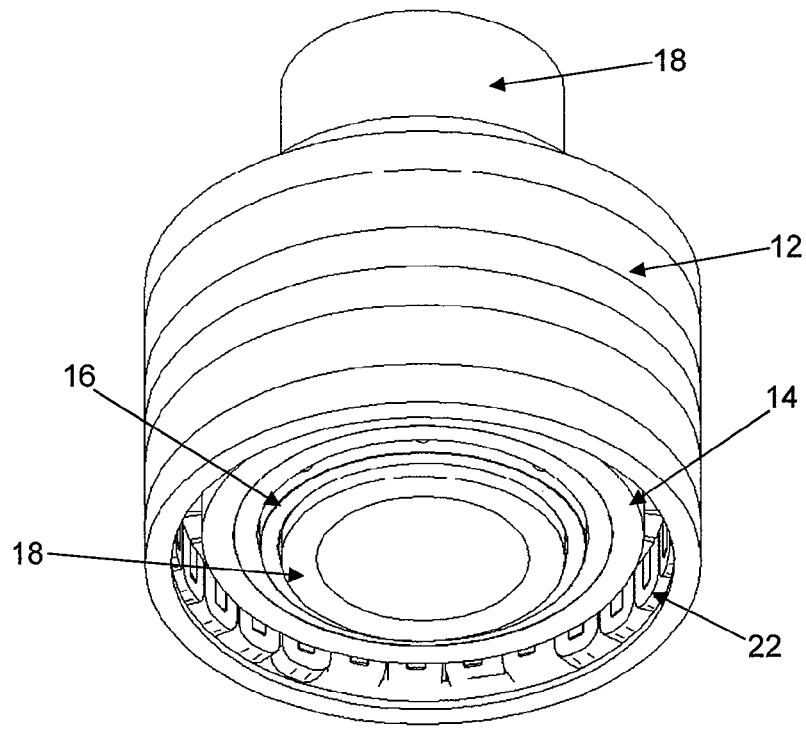
FIG. 2 is an isometric view of another end of the driving mechanism opposite to that shown in FIG. 1.

FIG. 2 is an isometric view of another end of the driving mechanism 10 opposite to that shown in FIG. 1. It further illustrates driving motor stator coils 22 of a driving motor, such as a servo motor mounted on the fixed housing 12, for driving the movable housing 14 to move relative to the central cylinder 18. The driving motor is operative to drive the movable housing 14 to move linearly as well as to rotate relative to the fixed housing 12.

Figure 3:
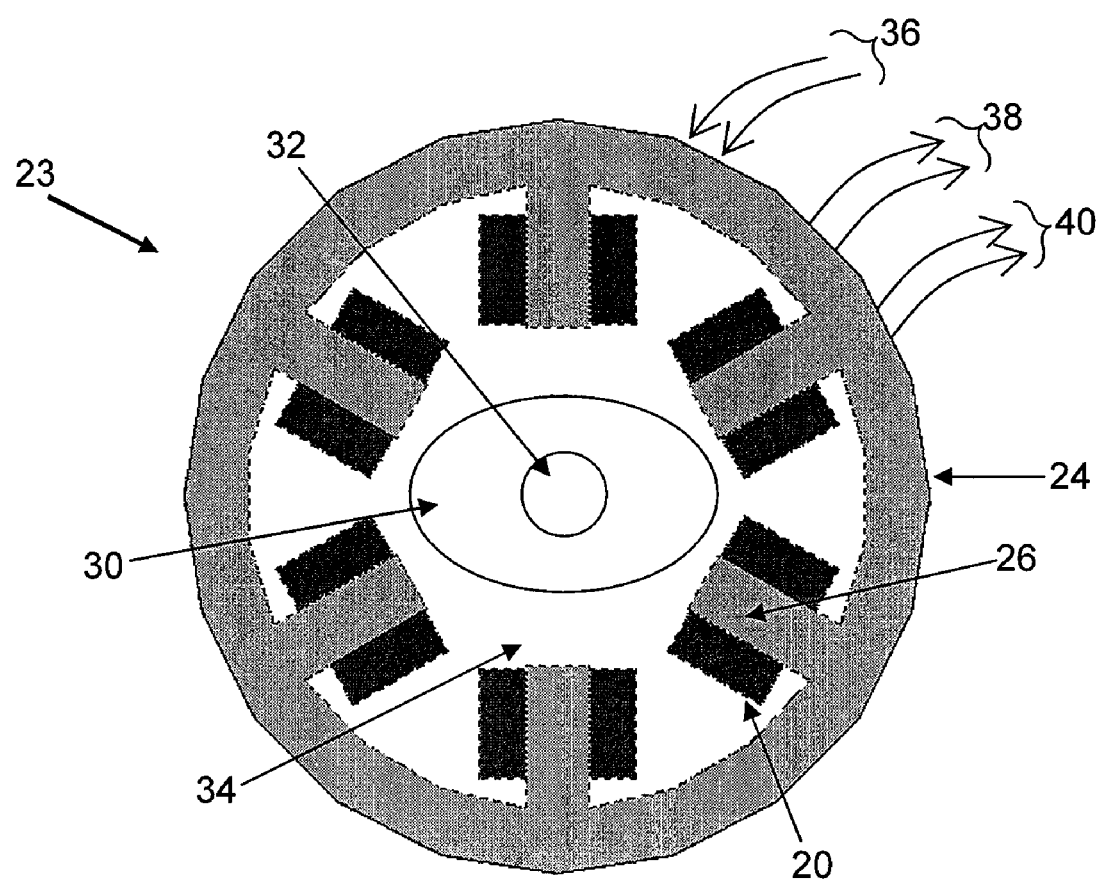
FIG. 3 is a cross-sectional view of a coil winding structure associated with a slotted resolver comprised in the inductance-type encoder.

FIG. 3 is a cross-sectional view of a coil winding structure associated with a slotted resolver 23 comprised in the inductance-type encoder. The said inductance-type encoder is operative to determine both linear and rotary displacement of the movable housing relative to the fixed housing, whereby to provide closed-loop control of the position of the object in both linear and rotary directions.

The slotted resolver 23 includes an encoder stator 24 which has a plurality of poles 26 extending inwardly from the encoder stator 24. A laminated core 30, preferably made of iron, is located centrally of the encoder stator 24 and is rotatable with respect to the poles 26. It has an inner hole 32 at its center for connecting wires or other peripherals to the object to be driven. An air gap 34 is formed between the laminated core 30 and poles 26, within which the laminated core 30 is rotatable. The slotted resolver 23 may be attached to either of the fixed housing 12 and movable housing 14, and the laminated core may be attached to the other of the fixed housing 12 and movable housing 14.

The resolver coils 20 are wound around the poles 26. At least one resolver coil (such as two resolver coils 20 and two poles 26) is meant for transmitting excitation signals, at least one resolver coil (such as two resolver coils 20 and two poles 26) is meant for picking up Sine signals which are generated depending on a position of the laminated core 30, and at least one resolver coil (such as the two remaining resolver coils 20 and two poles 26) is meant for picking up Cosine signals which are generated depending on the position of the laminated core 30. The total number of resolver coils 20 is preferably equal to 3n, where n is an integer greater than or equal to 1. The resolver coils 20 for transmitting excitation signals receive current from excitation cables 36, the resolver coils 20 for picking up Sine signals transmit current through Sine cables 38 and the resolver coils 20 for picking up Cosine signals transmit current through Cosine cables 40.

Figure 4:
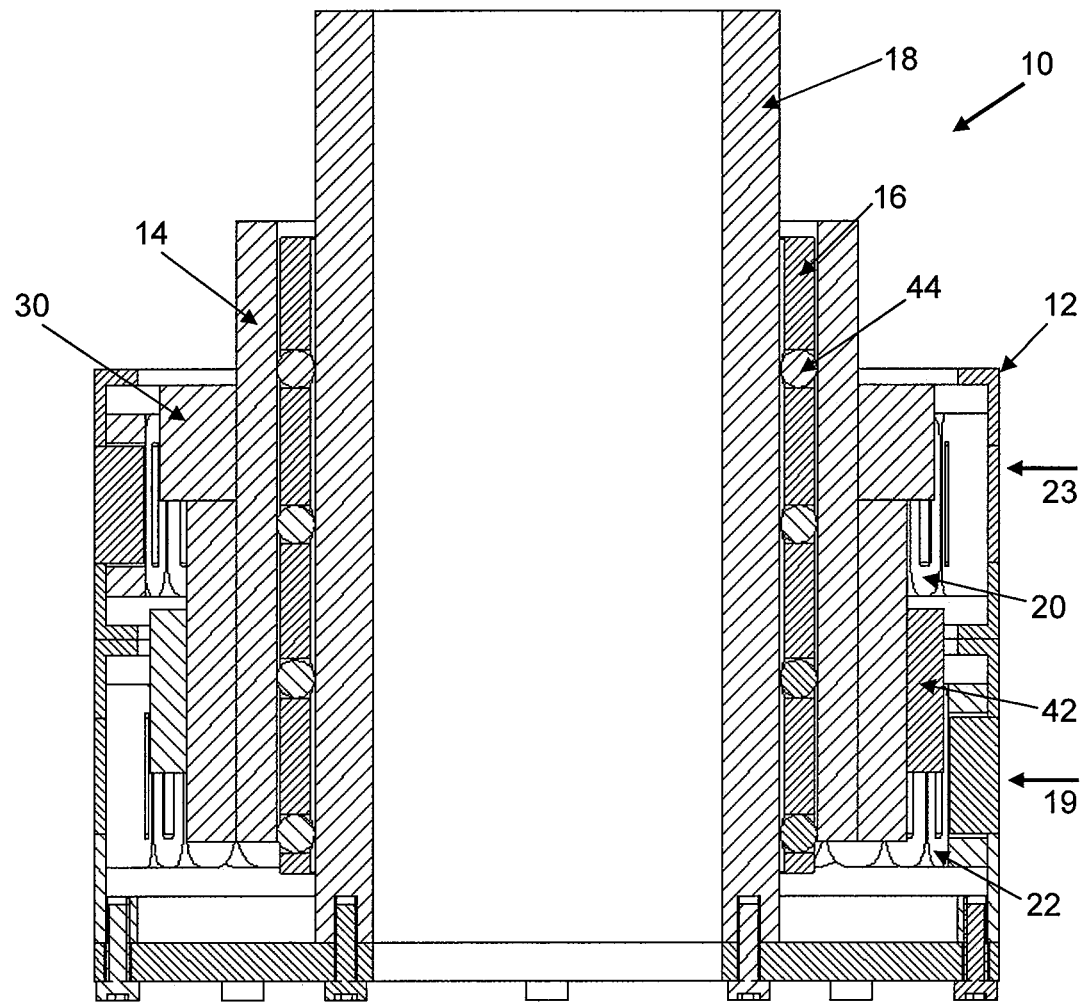
FIG. 4 is a cross-sectional view of a movable housing of the driving mechanism at a first position.

FIG. 4 is a cross-sectional view of the driving mechanism 10 wherein the movable housing 14 is at a first position relative to the central cylinder 18. The servo motor 19 includes the driving motor stator coils 22 which are attached to the fixed housing 12, and driving motor permanent magnets 42 which are attached to the movable housing 14. Conversely, the driving motor coils may be attached to the movable housing 14 and the driving motor permanent magnets may be attached to the fixed housing 12. The driving motor permanent magnets 42 are operative to electromagnetically interact with the driving motor stator coils 22 to drive the movable housing 14 to move linearly with respect to the fixed housing 12, as well as to rotate relative to the fixed housing 12.

The movable housing 14 is slidably supported on the central cylinder 18, and the linear-rotary bearings 16 are located between the movable housing 14 and the central cylinder 18. As the movable housing 14 moves, rollers 44 in the linear-rotary bearings 16 allow the movable housing 14 together with the linear-rotary bearings 16 to slide relative to the central cylinder 18, as well as relative to the fixed housing 12. Accordingly, an object mounted to the movable housing 14, such as an optical lens, may be driven to move linearly with respect to the fixed housing 12 and central cylinder 18, and may also rotate relative thereto, whereby to control linear and rotary motions of the object. This is as opposed to the aforesaid prior art driving mechanism including an inductance-type encoder, which only offers controlled rotary motion (but not linear motion) to the movable part of the driving mechanism. Furthermore, the central cylinder 18 may comprise a hollow center for locating wires and other peripherals for connection to the object.

As described above, the slotted resolver 23 comprises the resolver coils 20 and laminated core 30. As the movable housing 14 moves, it will also drive the laminated core 30 to move by a corresponding extent. Thus, the electrical signals picked up by the Sine coils 38 and Cosine coils 40 may be used to determine both the linear and rotary positions of the movable housing 14, thereby enabling closed-loop control of the position of the movable housing 14.

Figure 5:
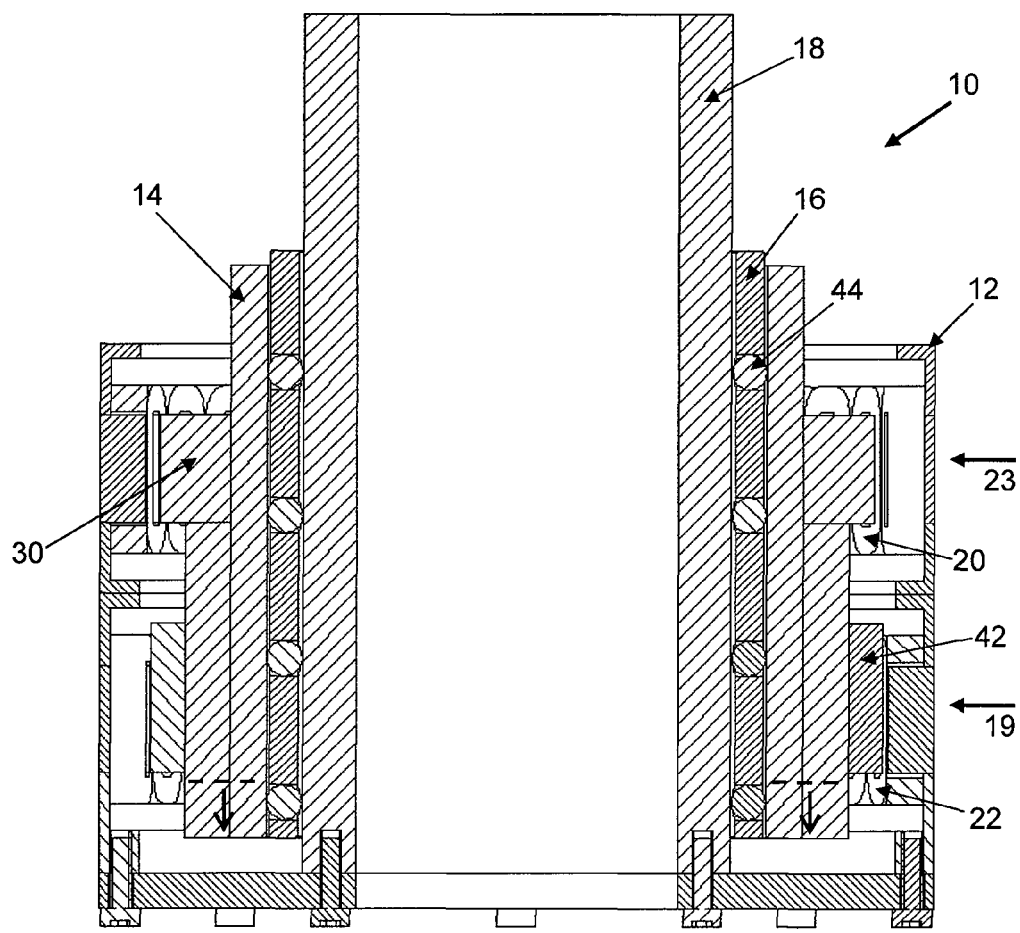
FIG. 5 is a cross-sectional view of the movable housing of the driving mechanism at a second position.

FIG. 5 is a cross-sectional view of the movable housing 14 of the driving mechanism 10 at a second position. The movable housing 14 and linear-rotary bearings 16 have moved to the second position from the first position by sliding along the central cylinder 18. The driving motor permanent magnets 42 and the laminated core 30 have moved relative to the driving motor stator coils 22 and resolver coils 20 respectively. The movement of the laminated core 30 allows the extent of linear and rotary motion of the movable housing 14 to be calculated.

An exemplary method of calculating the extent of movement of the movable housing 14 from the readings obtained from the Sine coils 38 and Cosine coils 40 is set out below.

The Excitation Signal sent through the excitation cables 36 may be expressed as:

$E(t) = A_e \sin \omega_o t$, where $E(t)$ is a voltage carried by the $A_e$ is the amplitude of the excitation signal, $\omega_o$ is the frequency of the excitation signal, and t is the time domain.

The Sine and Cosine signals picked up by the respective Sine and Cosine cables 38, 40 may be expressed as:

$$S_1(t) = a(z)\sin\theta \sin\omega_o t$$

$$S_2(t) = a(z)\cos\theta \sin\omega_o t$$

where $a(z)$ is the z-axis position information and $\theta$ is the angular position.

The SIN output windings and the COS output windings of the resolver coils 20 have a phase difference comprising an electrical angle of 90° therebetween. The rotary angle $\theta$ of the laminated core 30 may thus be determined with the above formulae.

To determine the vertical, z position, of the movable housing 14, the picked-up signals $S_1(t)$ and $S_2(t)$ are passed through an all-pass filter with a 90-degree phase shift, which may be implemented using an operational amplifier. Resultant signals $S_3(t)$ and $S_4(t)$ are obtained:

$$S_1(t) = a(z)\sin\theta \sin\omega_o t$$

$$S_3(t) = a(z)\sin\theta \cos\omega_o t$$

$$S_2(t) = a(z)\cos\theta \sin\omega_o t$$

$$S_4(t) = a(z)\cos\theta \cos\omega_o t$$

Analogue multiplications and summations are then performed as follows:

$$y_z(t) = S_1^2(t) + S_2^2(t) + S_3^2(t) + S_4^2(t)$$

$$y_z(t) = 2a^2(z)$$

The z-axis position information can finally be decoded with a Digital Signal Processor (DSP) using the formula:

$$a(z) = \sqrt{\frac{y_z(t)}{2}}$$

The Excitation, Sine and Cosine signals can be sent to a Resolver-to-Digital (R/D) Converter for calculating the rotational angle information. The above output signal $a(z)$ contains only the z-axis position information using the slotted resolver 23, which is independent of the rotational angle information calculated using the same slotted resolver 23.

Accordingly, with the above rotary angle θ and z-axis position a(z) obtained, two-dimensional positional information may be obtained for the driving mechanism 10, to allow the driving mechanism 10 to control movement of the object in both the linear and rotary directions using an inductance-type encoder as described above.

The invention described herein is susceptible to variations, modifications and/or addition other than those specifically described and it is to be understood that the invention includes all such variations, modifications and/or additions which fall within the spirit and scope of the above description.

The invention claimed is:

1. A driving mechanism comprising:
   a fixed housing;
   a movable housing on which an object to be driven is mounted;
   a driving motor which is operative to drive the movable housing to move linearly as well as to rotate relative to the fixed housing; and
   an inductance-type encoder configured and operative to determine both linear and rotary displacement of the movable housing relative to the fixed housing, and to provide closed-loop control of the position of the object in both linear and rotary directions.

2. The driving mechanism as claimed in claim 1, wherein the driving motor comprises a coil attached to either of the fixed housing and movable housing, and a permanent magnet attached to the other of the fixed housing and movable housing.

3. The driving mechanism as claimed in claim 1, further comprising a centrally-located cylinder on which the movable housing is slidably supported for movement relative to the fixed housing.

4. The driving mechanism as claimed in claim 3, further comprising linear-rotary bearings located between the movable housing and the centrally-located cylinder.

5. The driving mechanism as claimed in claim 3, wherein the centrally-located cylinder further comprises a hollow center for locating wires and other peripherals for connection to the object.

6. The driving mechanism as claimed in claim 1, wherein the inductance-type encoder further comprises a slotted resolver attached to either of the fixed housing and movable housing, and a laminated core attached to the other of the fixed housing and movable housing.

7. The driving mechanism as claimed in claim 6, wherein the slotted resolver comprises an encoder stator having a plurality of poles extending inwardly from the encoder stator, and wherein the laminated core is centrally located and rotatable with respect to the poles.

8. The driving mechanism as claimed in claim 7, further comprising resolver coils wound around the poles, wherein at least one resolver coil transmits excitation signals to the slotted resolver, at least one resolver coil picks up Sine signals which are generated depending on a position of the laminated core, and at least one resolver coil picks up Cosine signals which are generated depending on the position of the laminated core.

9. The driving mechanism as claimed in claim 8, wherein the total number of resolver coils equals 3n, where n is an integer greater than or equal to 1.

10. The driving mechanism as claimed in claim 6, further comprising an inner hole at a center of the laminated core for locating wires or other peripherals for connection to the object.

11. Method of driving a movable housing on which an object to be driven is mounted, comprising the steps of:
    driving the movable housing with a driving motor to move linearly as well as to rotate relative to a fixed housing;
    determining a linear displacement of the movable housing relative to the fixed housing with an inductance-type encoder; and
    determining a rotary displacement of the movable housing relative to the fixed housing with the inductance-type encoder, whereby to provide closed-loop control of the position of the object in both linear and rotary directions.

12. Method as claimed in claim 11, wherein the movable housing is slidably supported on a centrally-located cylinder for movement relative to the fixed housing.

13. Method as claimed in claim 12, wherein linear-rotary bearings are located between the movable housing and the centrally-located cylinder.

14. Method as claimed in claim 12, wherein the centrally-located cylinder further comprises a hollow center for locating wires and other peripherals for connection to the object.

15. Method as claimed in claim 11, wherein the inductance-type encoder further comprises a slotted resolver attached to either of the fixed housing and movable housing, and a laminated core attached to the other of the fixed housing and movable housing.

16. Method as claimed in claim 15, wherein the slotted resolver comprises an encoder stator having a plurality of poles extending inwardly from the encoder stator, and wherein the laminated core is centrally located and rotatable with respect to the poles.

17. Method as claimed in claim 16, further comprising resolver coils wound around the poles, wherein at least one resolver coil transmits excitation signals to the slotted resolver, at least one resolver coil picks up Sine signals which are generated depending on a position of the laminated core, and at least one resolver coil picks up Cosine signals which are generated depending on the position of the laminated core.

18. Method as claimed in claim 17, wherein the total number of resolver coils equals 3n, where n is an integer greater than or equal to 1.

19. Method as claimed in claim 15, further comprising an inner hole at a center of the laminated core for locating wires or other peripherals for connection to the object.

20. Method of driving a movable housing on which an object to be driven is mounted, comprising the steps of:
    driving the movable housing with a driving motor to move linearly as well as to rotate relative to a fixed housing;
    determining a linear displacement of the movable housing relative to the fixed housing with an inductance-type encoder, and determining a rotary displacement of the movable housing relative to the fixed housing with the inductance-type encoder, whereby to provide closed-loop control of the position of the object in both linear and rotary directions, wherein the driving motor comprises a coil attached to either of the fixed housing and movable housing, and a permanent magnet attached to the other of the fixed housing and movable housing.

* * * * *